(12) United States Patent
Aubay et al.

(10) Patent No.: US 7,074,919 B2
(45) Date of Patent: Jul. 11, 2006

(54) USE OF AMPHOTERIC POLYSACCHARIDE FOR TREATING TEXTILE FIBER ARTICLES

(75) Inventors: Eric Aubay, Princeton (FR); Etienne Fleury, Irigny (FR); Ian Harrison, Poissy (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 10/433,765

(22) PCT Filed: Dec. 20, 2001

(86) PCT No.: PCT/FR01/04110

§ 371 (c)(1),
(2), (4) Date: Jun. 5, 2003

(87) PCT Pub. No.: WO02/053600

PCT Pub. Date: Jul. 11, 2002

(65) Prior Publication Data

US 2004/0067864 A1    Apr. 8, 2004

(30) Foreign Application Priority Data

Dec. 28, 2000 (FR) .................................. 00 17219

(51) Int. Cl.
*C08B 37/00* (2006.01)
*C07H 11/00* (2006.01)
*C07H 1/00* (2006.01)
*C07H 13/00* (2006.01)
*C07H 13/12* (2006.01)

(52) U.S. Cl. ............... 536/114; 536/115; 536/117; 536/118; 536/119; 536/120; 536/122; 536/123; 536/123.1; 536/124

(58) Field of Classification Search ............... 536/114, 536/115, 117, 118, 119, 120, 122, 123, 123.1, 536/124

See application file for complete search history.

(56) References Cited

U.S. PATENT DOCUMENTS

| 3,467,647 A | 9/1969 | Benninga .................... 260/209 |
| 4,276,414 A | 6/1981 | Tessier ....................... 536/114 |

FOREIGN PATENT DOCUMENTS

| DE | 29 25 859 | 1/1981 |
| EP | 0 071 148 | 2/1983 |
| EP | 0 093 601 | 11/1983 |
| EP | 0 943 627 | 9/1999 |
| WO | WO 98 18828 | 5/1998 |

OTHER PUBLICATIONS

Patent Abstract of Japan, vol. 015, No. 048 (C-0802), Feb. 5, 1991 & JP 02 277881 a (Nippon Petrochem Co Ltd), Nov. 14, 1990 abstract.

*Primary Examiner*—James O. Wilson
*Assistant Examiner*—Everett White

(57) ABSTRACT

The invention concerns the use, in a composition for treating textile fiber articles in aqueous or moist medium, of an amphoteric polysaccharide, whereof the native skeleton is a polysaccharide consisting of a main chain comprising anhydrohexose units and branches comprising at least a neutral or anionic anhydropentose and/or anhydrohexose unit, the anhydrohexose and/or anhydropentose units being substituted of modified by groups bearing at least a (potentially) anionic load and/or at least a (potentially) cationic load, the degree of substitution or modification by the set of said groups bearing (potentially) anionic loads ranging between 0.01 and less than 3, with a ratio of the number of (potentially) anionic charges over the number of (potentially) cationic loads ranging between 99.5/0.5 to 30/70, as agent for preventing degradation and/or enabling to protect the colors of said articles and/or providing said articles with crease-resistant and/or softening properties

15 Claims, No Drawings

USE OF AMPHOTERIC POLYSACCHARIDE FOR TREATING TEXTILE FIBER ARTICLES

The present invention relates to the use, in a composition for caring for, in aqueous or wet medium, articles made of textile fibers and especially cotton-based articles, in particular colored articles, of an amphoteric polysaccharide as an agent for preventing the degradation of said articles and/or for protecting the colors of said articles and/or for affording said articles crease-resistance and/or softening properties.

The expression "care of articles made of textile fibers, in particular fabrics" means the protection of these articles against physical or chemical degradation phenomena, especially the protection of the colors of colored articles, and/or the provision of benefits thereto, for instance softening and/or crease-resistance properties.

The machine washing of fabrics leads to a physical and chemical degradation of the fibers and most particularly of cotton fibers. The alkalinity delivered by detergents and also by certain specific compounds such as oxidizing substances (perborate or percarbonate) or certain enzymes may be the cause of the chemical degradation of cotton fibers. However, it is generally the combination of the chemical and mechanical actions which leads to degradation of the fibers. The mechanical action is produced during the washing, rinsing, spin-drying or tumble-drying, when the latter takes place in a tumble dryer. This degradation of the fibers leads to the formation of fibrils at the surface of the textile which end up causing colored textiles to lose their radiance. This degradation also induces a decrease in the strength of the textile which, at the extreme, may lead to tearing of the fabrics. This degradation of the textiles may be evaluated quantitatively either by a loss of the colors of colored textiles or by a reduction in the tear strength of the textile. It is generally necessary to carry out 10 to 20 cumulative machine washes in order to perceive this type of degradation.

Cleaning in a washing machine, which systematically includes a spin-drying operation, also leads to creased fabrics, which is accentuated during the tumble-drying stage, in particular by the formation of inter-fiber hydrogen bonds. It is thus necessary to iron the fabrics in order to make them look presentable.

In order to reduce the degradation of the fibers during washing or rinsing, the suppliers of chemical products or detergents have made use of changes in detergent formulations or have used certain specific additives.

Mention may be made in particular of detergents comprising no oxidizing system, but which have reduced cleaning capacities.

Silicone-based compounds have also been used, and in particular aminosilicones (U.S. Pat. No. 4,585,563; WO 92/07927; WO 98/39401).

The Applicant has found that the use, in compositions for treating articles made of textile fibers, especially cotton-based articles, which are in particular colored, of certain amphoteric polysaccharides of high molecular mass that are soluble under the working conditions in aqueous or wet medium of said compositions, makes it possible to prevent the degradation of these articles, makes it possible to protect the colors and/or gives these articles crease-resistance and/or softening properties.

Such compositions may especially be compositions for washing and/or rinsing and/or softening fabrics, for destaining fabrics before washing ("prespotting"), for tumble-drying wet fabrics in a tumble dryer or for ironing fabrics.

A first subject of the invention consists of the use, in a composition for treating articles made of textile fibers in aqueous or wet medium, of at least one amphoteric polysaccharide, the native skeleton of which is a polysaccharide formed from

- a main chain comprising identical or different anhydrohexose units, and
- branches comprising at least one neutral or anionic anhydropentose and/or anhydrohexose unit, the anhydrohexose and/or anhydropentose units of said amphoteric polysaccharide being substituted or modified with one or more groups bearing at least one anionic or potentially anionic charge and/or at least one cationic or potentially cationic charge, the degree of substitution or of modification DSi of the anhydrohexose and/or anhydropentose units with all said groups bearing ionic or potentially ionic charges ranging from 0.01 to less than 3 and preferably from 0.05 to 2.5, with a ratio of the number of anionic or potentially anionic charges to the number of cationic or potentially cationic charges ranging from 99.5/0.5 to 30/70 and preferably from 99.5/0.5 to 50/50, as an agent for preventing the degradation of said articles and/or for protecting the colors of said articles and/or for affording said articles crease-resistance and/or softening properties.

The weight-average molar mass of said amphoteric polysaccharides may range from 2000 to 3 000 000, preferably from 10 000 to 2 000 000 and most particularly from 10 000 to 500 000.

The weight-average molar mass Mw of said amphoteric polysaccharides may be measured by size exclusion chromatography. The measurement is performed in aqueous 0.1 M formic acid solution containing 0.05 M sodium nitrate and 10 ppm of high molar mass polyallyldimethylamine chloride (PDADMA) in the case of polysaccharides whose DSi with ionic or potentially ionic functions is less than 0.5. For those whose DSi is greater than 0.5, an aqueous 0.025 M hydrochloric acid solution is used.

The weight-average molar mass Mw is established directly in a manner that is known per se via the light-scattering values.

The degree of substitution or of modification DSi corresponds to the average number of hydroxyl functions in the anhydrohexose and/or anhydropentose units that are substituted or modified with said ionic or potentially ionic group(s), per anhydrohexose and/or anhydropentose unit.

Said ionic or potentially ionic groups are linked to the carbon atoms of the sugar skeleton either directly or via —O— bonds.

According to the invention, the anionic or potentially anionic charges may be provided by substituent or modifying groups that are different than those bearing cationic or potentially cationic charges; said polymer is then an ampholytic polysaccharide.

Also according to the invention, the same substituent or modifying group may bear both an anionic or potentially anionic charge and a cationic or potentially cationic charge; said polysaccharide is then of betaine type.

According to one embodiment variant of the invention, said amphoteric polysaccharide may also contain at least one nonionic group.

Said nonionic groups are linked to the carbon atoms of the sugar skeleton either directly or via —O— bonds.

The presence of such groups is expressed as the number of moles of substitution MS, i.e. as the average number of moles of precursor of said nonionic substituent that have reacted per anhydrohexose and/or anhydropentose unit.

If said precursor is incapable of forming new reactive hydroxyl groups (for example alkylation precursor), the degree of substitution or of modification with all the ionic or ionizable and nonionic groups is less than 3, by definition.

If said precursor is capable of forming new reactive hydroxyl groups (for example hydroxyalkylation precursor), the number of moles of substitution MS is theoretically unlimited; it may be, for example, up to 6 and preferably up to 2.

Among the anionic or potentially anionic groups that may be mentioned are those containing one or more carboxylate (carboxylic), sulfonate (sulfonic), sulfate (hydrogen sulfate), phosphate (hydrogen phosphate), phosphonate (hgydrogen phosphonate), etc. functions.

Mention may be made in particular of those of formula

—[—$CH_2$—$CH(R)$—$O]_x$—$(CH_2)_y$—COOH or

—[—$CH_2$—$CH(R)$—$O]_x$—$(CH_2)_y$—COOM in which:
R is a hydrogen atom or an alkyl radical containing from 1 to 4 carbon atoms,
x is an integer ranging from 0 to 5,
y is an integer ranging from 0 to 5,
M represents an alkali metal.

Mention may be made most particularly of carboxyl groups —$COO^-Na^+$ linked directly to a carbon atom of the sugar skeleton, and carboxymethyl groups (sodium salt)—$CH_2$—$COO^-Na^+$ linked to a carbon atom of the sugar skeleton via an —O— bond.

Among the cationic or potentially cationic groups that may be mentioned are those containing one or more amino, ammonium, phosphonium, pyridinium, etc. functions.

Mention may be made in particular of the cationic or potentially cationic groups of formula

—$NH_2$

—[—$CH_2$—$CH(R)$—$O]_x$—$(CH_2)_y$—COA—R'—N(R'')$_2$

—[—$CH_2$—$CH(R)$—$O]_x$—$(CH_2)_y$—COA—R'—$N^+$(R''')$_3$ $X^-$

—[—$CH_2$—$CH(R)$—$O]_x$—$(CH_2)_y$—COA—R'—NH—R''''—N(R'')$_2$

—[—$CH_2$—$CH(R)$—$O]_x$—R'—N(R'')$_2$

—[—$CH_2$—$CH(R)$—$O]_x$—R'—$N^+$(R''')$_3$ $X^-$

—[—$CH_2$—$CH(R)$—$O]_x$—R'—NH—R''''—N(R'')$_2$

—[—$CH_2$—$CH(R)$—$O]_x$—Y—R'' in which
R is a hydrogen atom or an alkyl radical containing from 1 to 4 carbon atoms
x is an integer ranging from 0 to 5
y is an integer ranging from 0 to 5
R' is an alkylene radical containing from 1 to 12 carbon atoms, optionally bearing one or more OH substituents
the radicals R'', which may be identical or different, represent a hydrogen atom or an alkyl radical containing from 1 to 18 carbon atoms
the radicals R''', which may be identical or different, represent an alkyl radical containing from 1 to 18 carbon atoms
R'''' is a linear, branched or cyclic alkylene radical containing from 1 to 6 carbon atoms A represents O or NH
Y is a heterocyclic aliphatic group containing from 5 to 20 carbon atoms and a nitrogen hetero atom
$X^-$ is a counterion, preferably halide (especially chloride, bromide or iodide), and also N-alkylpyridinium-yl groups in which the alkyl radical contains from 1 to 18 carbon atoms, with a counterion, preferably halide (especially chloride, bromide or iodide).

Among the cationic or potentially cationic groups that may be mentioned most particularly are:
those of formula

—$NH_2$

—$CH_2$—CONH—$(CH_2)_2$—$N(CH_3)_2$

—$CH_2$—COO—$(CH_2)_2$—NH—$(CH_2)_2$—$N(CH_3)_2$

—$CH_2$—CONH—$(CH_2)_3$—NH—$(CH_2)_2$—$N(CH_3)_2$

—$CH_2$—CONH—$(CH_2)_2$—NH—$(CH_2)_2$—$N(CH_3)_2$

—$CH_2$—CONH—$(CH_2)_2$—$N^+(CH_3)_3$ $Cl^-$

—$CH_2$—CONH—$(CH_2)_3$—$N^+(CH_3)_3$ $Cl^-$

—$(CH_2)_2$—$N(CH_3)_2$

—$(CH_2)_2$—NH—$(CH_2)_2$—$N(CH_3)_2$

—$(CH_2)_2$—$N^+(CH_3)_3$ $Cl^-$ 2-hydroxypropyltrimethylammonium chloride —$CH_2$—$CH(OH)$—$CH_2$—$N^+(CH_3)_3$ $Cl^-$ pyridinium-yl groups such as N-methyl pyridinium-yl, of formula

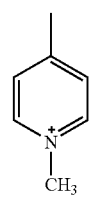

with a chloride counterion
hindered amino groups such as those derived from HALS amines, of general formula:

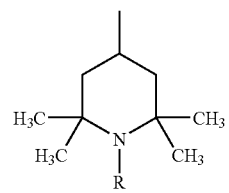

which R represents $CH_3$ or H.

Among the betaine groups that may be mentioned most particularly are the functions of formula:

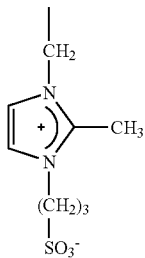

2-methyl (3-sulfopropyl) imidazolium function

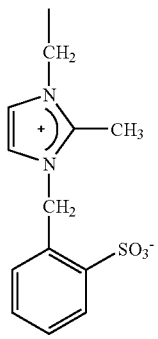

(2-sulfobenzyl)imidazolium function

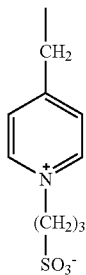

(3-sulfopropyl)pyridinium function

—(CH$_2$)$_2$—N$^+$(CH$_3$)$_2$—(CH$_2$)$_2$—COO$^-$ ethyl-dimethylammonium betaine function —(CH$_2$)$_2$—N$^+$(CH$_3$)$_2$—(CH$_2$)$_3$—SO$_3^-$ sulfo-propyl dimethylammonium function.

Among the nonionic groups that may be mentioned are those of formula:

—[—CH$_2$—CH(R)—O]$_x$—R$^1$ in which:

R is a hydrogen atom or an alkyl radical containing from 1 to 4 carbon atoms, x is an integer ranging from 0 to 5, R$^1$ represents:
  a hydrogen atom
  an alkyl radical containing from 1 to 22 carbon atoms, optionally interrupted with one or more oxygen and/or nitrogen hetero atoms, cycloalkyl, aryl or arylalkyl, containing from 6 to 12 carbon atoms,
  a radical —(CH$_2$)$_y$—COOR$^2$
  a radical —(CH$_2$)$_y$—CN
  a radical —(CH$_2$)$_y$—CONHR$^2$ R$^2$ representing an alkyl, aryl or arylalkyl radical containing from 1 to 22 carbon atoms, and
y is an integer ranging from 0 to 5
  —CO—NH—R$^1$
R$^1$ having the definition given above,
linked to a carbon atom of the sugar skeleton via an —O— bond.

Mention may be made most particularly of the following groups:
  methyl, ethyl, propyl, isopropyl, butyl, hexyl, octyl, dodecyl, octadecyl, phenyl, benzyl, linked to a carbon atom of the sugar skeleton via an ether, ester, amide or urethane bond,
  cyanoethyl, hydroxyethyl, hydroxypropyl, hydroxybutyl, linked to a carbon atom of the sugar skeleton via an —O— bond.

The hexose units (identical or different) of the main chain of the native skeleton may be D-glucose, D- or L-galactose, D-mannose, D- or L-fucose, L-rhamnose, etc. units.

The neutral or anionic pentose and/or hexose units (identical or different) of the branches of the native skeleton may be D-xylose, L- or D-arabinose, D-glucose, D- or L-galactose, D-mannose, D- or L-fucose, L-rhamnose, etc., D-glucuronic acid, D-galacturonic acid, D-mannuronic acid, etc. units.

Examples of native skeletons that may be mentioned include galactomannans, galactoglucomannans, xyloglucans, xanthan gums, scleroglucans, succinoglycans, rhamsans, welan gums, etc.

The native skeleton is preferably a galactomannan. Galactomannans are macromolecules comprising a main chain of D-mannopyranose units linked in position β(1-4) substituted with D-galactopyranose units in position α(1-6). Among these, mention may be made of guar gum, carob gum and tara gum.

The native skeleton is most preferably a guar gum. Guar gums have a mannose/galactose ratio of 2.

The amphoteric polysaccharides used according to the invention may be obtained by functionalizing the native skeleton using precursors of the ionic or potentially ionic and possibly nonionic groups. These functionalization operations may be performed in a known manner by oxidation, substitution, condensation or addition.

As examples of amphoteric polysaccharides that may be used according to the invention, mention may be made of carboxymethyl hydroxypropyltrimethylammonium chloride galactomannans, in particular carboxymethyl hydroxypropyltrimethylammonium chloride guars, carboxymethyl hydroxypropyl hydroxypropyltrimethylammonium chloride galactomannans, in particular carboxymethyl hydroxypropyl hydroxypropyltrimethylammonium chloride guars.

The carboxymethyl groups may be introduced, for example, by carboxymethylation with monochloroacetic acid; the hydroxypropyltrimethyl-ammonium groups may be introduced, for example, by etherification or epoxidation using 3-chloro-2-hydroxy-propyltrimethylammonium chloride or epoxypropyl-trimethylammonium chloride; carboxymethyl groups may be introduced in a known manner, for example by carboxymethylation with monochloroacetic acid.

A second subject of the invention consists of a process for improving the properties of compositions for treating or caring for articles made of textile fibers in aqueous or wet medium, by adding to said compositions at least one amphoteric polysaccharide as described above, as an agent for preventing the degradation of said articles and/or for protecting the colors of said articles and/or for affording said articles crease-resistance and/or softening properties.

Said polysaccharide used according to the invention contains ionic or ionizable charges at the working pH of said treatment composition.

The composition and the working (or treatment) conditions may be in numerous forms.

Said composition may be in the form of a solid (powder, granules, tablets, etc.) or of a dispersion or of a concentrated aqueous solution placed in contact with the articles to be treated, after dilution in water;

in the form of a dispersion or of a concentrated aqueous solution placed beforehand on the dry articles to be treated before dilution in water;

in the form of a dispersion or of an aqueous solution to be placed directly on the dry articles to be treated without dilution or of a solid support (stick) comprising said amphoteric polysaccharide, to be applied directly to the dry articles to be treated;

in the form of an insoluble solid support comprising said amphoteric polysaccharide placed directly in contact with the wet articles to be treated.

Thus, the composition of the invention may be:

a solid or liquid detergent formulation capable of directly forming a washing bath by dilution;

a liquid rinsing and/or softening formulation capable of directly forming a rinsing and/or softening bath by dilution;

a solid material, in particular a textile, comprising said amphoteric polysaccharide, which is intended to be placed in contact with wet fabrics in a tumble dryer (said solid material is referred to hereinbelow as a "tumble dryer additive");

an aqueous ironing formulation;

a washing additive ("prespotter") intended to be placed on the dry fabrics prior to a washing operation using a detergent formulation containing or not containing said amphoteric polysaccharide (said additive is referred to hereinbelow as a "prespotter").

Said composition of the invention is particularly suitable for fabric care, especially for cotton-based fabrics, in particular fabrics containing at least 35% cotton. It is most particularly suitable for caring for colored fabrics.

The amphoteric polysaccharides used according to the invention are soluble under the working conditions in aqueous or wet medium of said composition.

Said amphoteric polysaccharides are considered as soluble when more than 50% and preferably more than 70% of their weight are soluble in the working aqueous or wet medium of the composition of the invention, i.e. especially under the temperature and pH conditions of said medium.

The working pH of the composition of the invention may range from about 2 to about 12, depending on the desired use.

When it is:

a detergent formulation, the pH of the washing bath is generally from about 7 to 11 and preferably from 8 to 10.5;

a rinsing and/or softening formulation, the pH of the rinsing and/or softening bath is generally from about 2 to 8;

a tumble dryer additive, the pH to be considered is that of the residual water, which may be from about 2 to 9;

an aqueous ironing formulation, the pH of said formulation is generally from about 5 to 9;

a prespotter, the pH to be considered is that of the washing bath for the operation following washing, i.e. from about 7 to 11 and preferably from 8 to 10.5.

The amount of amphoteric polysaccharide used according to the invention may range from 0.05% to 10% as dry weight relative to the dry weight of said composition, depending on the desired application.

Thus, said amphoteric polysaccharide (AP) may be used as follows:

| % of (AP) (as dry weight) | in a care composition used as |
|---|---|
| 0.05–5 preferably 0.1–3 | detergent formulation |
| 0.05–3 preferably 0.1–2 | rinsing and/or softening formulation |
| 0.05–10 | tumble dryer additive |
| 0.05–10 preferably 0.1–5 | ironing formulation |
| 0.05–10 preferably 0.1–5 | prespotter |

Other constituents may be present, along with the amphoteric polysaccharide, in the care composition. Said composition may contain at least one surfactant and/or one detergent additive and/or rinsing additive and/or softening additive for articles made of textile fibers and/or one solid support (especially a textile support) for said amphoteric polysaccharide.

The nature of these constituents depends on the desired use of said composition.

Thus, when it is a detergent formulation, for washing fabrics, it generally comprises:

at least one natural and/or synthetic surfactant, at least one detergent adjuvant ("builder")

optionally an oxidizing agent or system, and a series of specific additives.

The detergent formulation may comprise surfactants in an amount corresponding to about 3% to 40% by weight relative to the detergent formulation, these surfactants being such as Anionic Surfactants alkyl ester sulfonates of formula R—CH($SO_3$M)—COOR', in which R represents a $C_8$–$C_{20}$ and preferably $C_{10}$–$C_{16}$ alkyl radical, R' represents a $C_1$–$C_6$ and preferably $C_1$–$C_3$ alkyl radical and M represents an alkali metal (sodium, potassium or lithium) cation, a substituted or unsubstituted ammonium (methyl-, dimethyl-, trimethyl- or tetramethylammonium, dimethylpiperidinium, etc.) or an alkanolamine derivative (monoethanolamine, diethanolamine, triethanolamine, etc.). Mention may be made most particularly of methyl ester sulfonates in which the radical R is $C_{14}$–$C_{16}$;

alkyl sulfates of formula ROSO$_3$M, in which R represents a $C_5$–$C_{24}$ and preferably $C_{10}$–$C_{18}$ alkyl or hydroxyalkyl radical, M representing a hydrogen atom or a cation of the same definition as above, and also the ethoxylenated (EO) and/or propoxylenated (PO) derivatives thereof, containing on average from 0.5 to 30 and preferably from 0.5 to 10 EO and/or PO units;

alkylamide sulfates of formula RCONHR'OSO$_3$M in which R represents a $C_2$–$C_{22}$ and preferably $C_6$–$C_{20}$ alkyl radical, R' represents a $C_2$–$C_3$ alkyl radical, M representing a hydrogen atom or a cation of the same definition as above, and also the ethoxylenated (EO) and/or propoxylenated (PO) derivatives thereof, containing on average from 0.5 to 60 EO and/or PO units;

saturated or unsaturated $C_8$–$C_{24}$ and preferably $C_{14}$–$C_{20}$ fatty acid salts, $C_9$–$C_{20}$ alkylbenzenesulfonates, primary or secondary $C_8$–$C_{22}$ alkylsulfonates, alkylglyceryl sulfonates, the sulfonated polycarboxylic acids described in GB-A-1 082 179, paraffin sulfonates, N-acyl N-alkyltaurates, alkyl phosphates, isethionates, alkyl succinamates, alkyl sulfosuccinates, sulfosuccinate monoesters or diesters, N-acyl sarcosinates, alkylglycoside sulfates, polyethoxycarboxylates; the cation being an alkali metal (sodium, potassium or lithium), a substituted or unsubstituted ammonium residue (methyl-, dimethyl-, trimethyl- or tetramethylammonium, dimethylpiperidinium, etc.) or an alkanolamine derivative (monoethanolamine, diethanolamine, triethanolamine, etc.);

Nonionic Surfactants polyoxyalkylenated (polyoxyethylenated, polyoxy-propylenated or polyoxybutylenated) alkylphenols in which the alkyl substituent is $C_6$–$C_{12}$ and containing from 5 to 25 oxyalkylene units; examples which may be mentioned are the products Triton X-45, X-114, X-100 or X-102 sold by Rohm & Haas Co.;

glucosamide, glucamide or glycerolamide;

polyoxyalkylenated $C_8$–$C_{22}$ aliphatic alcohols containing from 1 to 25 oxyalkylene (oxyethylene or oxypropylene) units; examples which may be mentioned are the products Tergitol 15-S-9 and Tergitol 24-L-6 NMW sold by Union Carbide Corp., Neodol 45-9, Neodol 23-65, Neodol 45-7 and Neodol 45-4 sold by Shell Chemical Co., and Kyro EOB sold by The Procter & Gamble Co.;

products resulting from the condensation of ethylene oxide or the-compound resulting from the condensation of propylene oxide with propylene glycol, such as the Pluronic products sold by BASF;

products resulting from the condensation of ethylene oxide or the compound resulting from the condensation of propylene oxide with ethylenediamine, such as the Tetronic products sold by BASF;

amine oxides such as $C_{10}$–$C_{18}$ alkyl dimethylamine oxides and $C_8$–$C_{22}$ alkoxy ethyl dihydroxyethylamine oxides;

the alkylpolyglycosides described in U.S. Pat. No. 4,565,647;

$C_8$–$C_{20}$ fatty acid amides;

ethoxylated fatty acids;

ethoxylated fatty amides;

ethoxylated amines.

Amphoteric and Zwitterionic Surfactants alkyldimethylbetaines, alkylamidopropyldimethylbetaines, alkyltrimethylsulfobetaines and the products of condensation of fatty acids and of protein hydrolysates;

alkyl amphoacetates or alkyl amphodiacetates in which the alkyl group contains from 6 to 20 carbon atoms.

The detergent adjuvants ("builders") for improving the surfactant properties may be used in amounts corresponding to about 5–50% and preferably to about 5–30% by weight for the liquid detergent formulations or to about 10–80% and preferably 15–50% by weight for the powder detergent formulations, these detergent adjuvants being such as:

Mineral Detergent Adjuvants polyphosphates (tripolyphosphates, pyrophosphates, orthophosphates or hexametaphosphates) of alkali metals, of ammonium or of alkanolamines tetraborates or borate precursors;

silicates, in particular those with an $SiO_2/Na_2O$ ratio from about 1.6/1 to 3.2/1 and the lamellar silicates described in U.S. Pat. No. 4,664,839;

alkali metal or alkaline-earth metal carbonates (bicarbonates, sesquicarbonates);

cogranulates of alkali metal silicate hydrates and of alkali metal (sodium or potassium) carbonates that are rich in silicon atoms in Q2 or Q3 form, described in EP-A-488 868;

crystalline or amorphous aluminosilicates of alkali metals (sodium or potassium) or of ammonium, such as zeolites A, P, X, etc.; zeolite A with a particle size of about 0.1–10 micrometers is preferred.

Organic Detergent Adjuvants water-soluble polyphosphonates (ethane 1-hydroxy-1,1-diphosphonates, methylenediphosphonate salts, etc.);

water-soluble salts of carboxylic polymers or copolymers or water-soluble salts thereof, such as:

polycarboxylate ethers (oxydisuccinic acid and its salts, monosuccinic acid tartrate and its salts, disuccinic acid tartrate and its salts);

hydroxypolycarboxylate ethers;

citric acid and its salts, mellitic acid and succinic acid and their salts;

polyacetic acid salts (ethylenediaminetetraacetates, nitrilotriacetates, N-(2-hydroxyethyl)nitrilodiacetates);

$C_5$–$C_{20}$ alkyl succinic acids and their salts (2-dodecenylsuccinates, lauryl succinates);

carboxylic polyacetal esters;

polyaspartic acid and polyglutamic acid and their salts;

polyimides derived from the polycondensation of aspartic acid and/or of glutamic acid;

polycarboxymethyl derivatives of glutamic acid or of other amino acids.

The detergent formulation may also comprise at least one oxygen-releasing bleaching agent comprising a percompound, preferably a persalt.

Said bleaching agent may be present in an amount corresponding to about 1% to 30% and preferably from 4% to 20% by weight relative to the detergent formulation.

As examples of percompounds which may be used as bleaching agents, mention should be made in particular of perborates such as sodium perborate monohydrate or tetrahydrate; peroxygenated compounds such as sodium carbonate peroxyhydrate, pyrophosphate peroxyhydrate, urea peroxyhydrate, sodium peroxide and sodium persulfate.

The preferred bleaching agents are sodium perborate monohydrate or tetrahydrate and/or sodium carbonate peroxyhydrate.

Said agents are generally combined with a bleaching activator which generates, in situ in the washing medium, a peroxycarboxylic acid in an amount corresponding to about 0.1% to 12% and preferably from 0.5% to 8% by weight relative to the detergent formulation. Among these activators, mention may be made of tetraacetylethylenediamine, tetraacetyl-methylenediamine, tetraacetylglycoluryl, sodium p-acetoxybenzenesulfonate, pentaacetylglucose and octaacetyllactose.

Mention may also be made of non-oxygenated bleaching agents, which act by photoactivation in the presence of oxygen, these being agents such as sulfonated aluminum and/or zinc phthalocyanins.

The detergent formulation may also comprise soil-release agents, anti-redeposition agents, chelating agents, dispersants, fluorescers, foam suppressants, softeners, enzymes and various other additives.

Soil-Release Agents

These may be used in amounts of about 0.01–10%, preferably about 0.1–5% and more preferably about 0.2–3% by weight.

Mention may be made more particularly of agents such as:
cellulose derivatives such as cellulose hydroxy ethers, methylcellulose, ethylcellulose, hydroxypropylmethylcellulose or hydroxybutylmethylcellulose;
polyvinyl esters grafted onto polyalkylene trunks, such as polyvinyl acetates grafted onto polyoxyethylene trunks (EP-A-219 048);
polyvinyl alcohols;
polyester copolymers based on ethylene terephthalate and/or propylene terephthalate and polyoxyethylene terephthalate units, with an ethylene terephthalate and/or propylene terephthalate (number of units)/polyoxyethylene terephthalate (number of units) molar ratio from about 1/10 to 10/1 and preferably from about 1/1 to 9/1, the polyoxyethylene terephthalates containing polyoxyethylene units with a molecular weight from about 300 to 5 000 and preferably from about 600 to 5 000 (U.S. Pat. No. 3,959,230, U.S. Pat. No. 3,893,929, U.S. Pat. No. 4,116,896, U.S. Pat. No. 4,702,857, U.S. Pat. No. 4,770,666);
sulfonated polyester oligomers obtained by sulfonation of an oligomer derived from ethoxylated allylic alcohol, from dimethyl terephthalate and from 1,2-propylene diol, containing from 1 to 4 sulfonated groups (U.S. Pat. No. 4,968,451);
polyester copolymers based on propylene terephthalate and polyoxyethylene terephthalate units and ending with ethyl or methyl units (U.S. Pat. No. 4,711,730) or polyester oligomers ending with alkylpolyethoxy groups (U.S. Pat. No. 4,702,857) or sulfopolyethoxy (U.S. Pat. No. 4,721,580) or sulfoaroyl (U.S. Pat. No. 4,877,896) anionic groups;
sulfonated polyester copolymers derived from terephthalic, isophthalic and sulfoisophthalic acid, anhydride or diester and from a diol (FR-A-2 720 399).

Anti-Redeposition Agents

These may be used in amounts generally of about 0.01–10% by weight for a powder detergent formulation of about 0.01–5% by weight for a liquid detergent formulation.

Mention may be made in particular of agents such as:
ethoxylated monoamines or polyamines, and ethoxylated amine polymers (U.S. Pat. No. 4,597,898, EP-A-11 984);
carboxymethylcellulose;
sulfonated polyester oligomers obtained by condensation of isophthalic acid, dimethyl sulfo-succinate and diethylene glycol (FR-A-2 236 926);
polyvinylpyrrolidones.

Chelating Agents

Agents for chelating iron and magnesium may be present in amounts of about 0.1–10% and preferably of about 0.1–3% by weight.

Mention may be made, inter alia, of:
aminocarboxylates such as ethylenediaminetetra-acetates, hydroxyethylethylenediaminetriacetates and nitrilotriacetates;
aminophosphonates such as nitrilotris(methylene-phosphonates);
polyfunctional aromatic compounds such as dihydroxydisulfobenzenes.

Polymeric Dispersants

These may be present in an amount of about 0.1–7% by weight, to control the calcium and magnesium hardness, these being agents such as:
water-soluble polycarboxylic acid salts with a molecular mass from about 2 000 to 100 000, obtained by polymerization or copolymerization of ethylenically unsaturated carboxylic acids such as acrylic acid, maleic acid or anhydride, fumaric acid, itaconic acid, aconitic acid, mesaconic acid, citraconic acid or methylenemalonic acid, and most particularly polyacrylates with a molecular mass from about 2 000 to 10 000 (U.S. Pat. No. 3,308,067), copolymers of acrylic acid and of maleic anhydride with a molecular mass from about 5 000 to 75 000 (EP-A-66 915);
polyethylene glycols with a molecular mass from about 1 000 to 50 000.

Fluorescers (Brighteners)

These may be present in an amount of about 0.05–1.2% by weight, these being agents such as: stilbene, pyrazoline, coumarin, fumaric acid, cinnamic acid, azole, methinecyanin, thiophene, etc. derivatives ("The production and application of fluorescent brightening agents"—M. Zahradnik, published by John Wiley & Sons, New York, 1982).

Foam Suppressants

These may be present in amounts which may be up to 5% by weight, these being agents such as:
$C_{10}$–$C_{24}$ monocarboxylic fatty acids or alkali metal, ammonium or alkanolamine salts thereof, and fatty acid triglycerides;
saturated or unsaturated aliphatic, alicyclic, aromatic or heterocyclic hydrocarbons, such as paraffins and waxes;
N-alkylaminotriazines;
monostearyl phosphates and monostearyl alcohol phosphates;
polyorganosiloxane oils or resins optionally combined with silica particles.

Softeners

These may be present in amounts of about 0.5–10% by weight, these being agents such as clays.

Enzymes

These may be present in an amount which may be up to 5 mg by weight and preferably of about 0.05–3 mg of active enzyme/g of detergent formulation, these being enzymes such as:

proteases, amylases, lipases, cellulases and peroxidases (U.S. Pat. No. 3,553,139, U.S. Pat. No. 4,101,457, U.S. Pat. No. 4,507,219, U.S. Pat. No. 4,261,868).

Other Additives

Mention may be made, inter alia, of:
buffers,
fragrances,
pigments.

The detergent formulation may be used, in particular in a washing machine, in a proportion of from 0.5 g/l to 20 g/l and preferably from 2 g/l to 10 g/l to carry out washing operations at a temperature from about 25 to 90° C.

A second embodiment of the invention consists in using said amphoteric polysaccharide in an aqueous liquid formulation for rinsing and/or softening fabrics.

This formulation may be used in a proportion of from 0.2 to 10 g/l and preferably from 2 to 10 g/l.

Along with the amphoteric polysaccharide, there may be present other constituents of the type such as:

combinations of cationic surfactants (triethanolamine diester quaternized with dimethyl sulfate, N-methyl-imidazoline tallow ester methyl sulfate, dialkyl-dimethylammonium chloride, alkylbenzyldimethylammonium chloride, methyl alkylimidazolinium sulfate, methyl and methylbis (alkylamidoethyl)-2-hydroxyethylammonium sulfate, etc.) in an amount which may range from 3% to 50% and preferably from 4% to 30% of said formulation, optionally combined with nonionic surfactants (ethoxylated fatty alcohols, ethoxylated alkylphenols, etc.) in an amount which may be up to 3%;

optical brighteners (0.1% to 0.2%);

optionally, color-fast agents (polyvinylpyrrolidone, polyvinyloxazolidone, polymethacrylamide, etc. 0.03% to 25% and preferably 0.1% to 15%), colorants, fragrances, solvents, especially alcohols (methanol, ethanol, propanol, isopropanol, ethylene glycol or glycerol), foam limiters.

A third embodiment of the invention consists in using said amphoteric polysaccharide in an additive for drying fabrics in a suitable tumble dryer.

Said additive comprises a flexible solid support consisting, for example, of a strip of woven or nonwoven textile or a sheet of cellulose, impregnated with said amphoteric polysaccharide; said additive is introduced at the time of tumble-drying into the wet laundry to be dried at a temperature from about 50 to 80° C. for 10 to 60 minutes.

Said additive may also comprise cationic softeners (up to 99%) and color-fast agents (up to 80%), such as those mentioned above.

A fourth embodiment of the invention consists in using said amphoteric polysaccharide in an ironing formulation which may be sprayed directly onto the dry fabrics before ironing.

Said formulation may also contain silicone-based polymers (from 0.2% to 5%), nonionic surfactants (from 0.5% to 5%) or anionic surfactants (from 0.5% to 5%), fragrances (0.1% to 3%) or cellulose derivatives (0.1% to 3%), for instance starch; spraying said formulation onto the fabrics makes it easier to iron them and limits the creasing of the fabrics when they are worn.

A fifth embodiment of the invention consists in using said amphoteric polysaccharide in a prespotter which is in the form of an aqueous solution or dispersion or a solid (stick).

Along with the amphoteric polysaccharide, there may be present other constituents of the type such as:

anionic surfactants such as those already mentioned above, in an amount of at least 5% of the weight of the composition nonionic surfactants such as those already mentioned above, in an amount which may range from 15% to 40% of the weight of the composition aliphatic hydrocarbons, in an amount which can range from 5% to 20% of the weight of the composition.

A subject of the present invention is also the liquid aqueous rinsing and/or softening compositions, the tumble dryer additives, the aqueous ironing compositions and the tumble dryer additives described above.

The examples that follow are given for illustrative purposes.

The weight-average molar mass is determined as follows by size exclusion chromatography.

The measurement is performed in water at acidic pH containing 0.1 M formic acid, 0.05 M sodium nitrate and 10 ppm of PDMDMA Cl$^-$.

The characteristics of the machine are as follows:

chromatography columns: 3 Shodex SB806HQ 30 cm, 5 μm columns, 40° C.

injector-pump: Waters 515+Wisp 717+ detector: RI Waters 410 Sensitivity 8 refractometer, MALLS Wyatt light scattering, 633 nm He laser flow rate: 1 ml/minute.

The injected solution (200 μl) contains about 0.2% by weight of polyampholytic polysaccharide. The weight-average molecular mass is established directly without calibration, using the light scattering values extrapolated to zero angle; these values are proportional to $CxMx(dn/dc)^2$.

C corresponds to the polysaccharide concentration

M corresponds to the weight-average molecular mass n corresponds to the optical index of the solution c corresponds to the polysaccharide concentration the ratio dn/dc is equal here to 0.150

EXAMPLES 1–3 a—Modification of a Guar with 3-chloro-2-hydroxypropyltrimethylammonium chloride The synthesis is performed in a 3 liter jacket-heated reactor/mixer. Stirring is performed using a horizontal shaft equipped with arms of specific geometry and counter-paddles attached to the body of the reactor. The gap of a few millimeters allows the solid particles to be stirred without excessive shear.

The test proceeds according to the various steps below:

introduction of distilled water (220 g) at 30° C., followed by addition of the 3-chloro-2-hydroxypropyltrimethylammonium chloride reagent (0.56 mol, i.e. 133 g at 65% in H$_2$O) and mixing for 1 minute introduction of a first load of sodium hydroxide (93 g of NaOH at 20% in water) and mixing for 1 minute, the temperature being maintained below 38° C.

introduction of guar with a weight-average molar mass of about 2 500 000 g/mol in divided form (in the form of "splits") (400 g), followed by flushing of the reaction medium by alternately placing under vacuum and placing under pressure (at least three times)

introduction of a second load of sodium hydroxide (82 g at 20% in water) over 20–30 minutes, followed by further flushing of the reaction medium heating to reach 43–50° C. and then maintenance at 43–50° C. for 40 minutes under a slight positive pressure of nitrogen after reaction, 16 g of aqueous 3% borax solution and 5 g of cardice (CO$_2$) are added. The reactor is emptied out after it has been cooled to a temperature below 38° C.

the reaction medium may be washed with water and then with acetone, then dried under vacuum at 40° C.

b—Modification of hydroxypropyltrimethylammonium chloride Guar with Monochloroacetic Acid After purging the system for a long time with argon, 368 ml of isopropyl alcohol (IPA) are introduced into a one-liter four-necked round-bottomed flask equipped with a condenser and a motor-driven Teflon-paddle stirrer. After switching on the stirrer (150 rpm), 50 g of the powdered cationic guar reagent are added. A uniform dispersion is obtained, and 120 g of aqueous 9.36% sodium hydroxide solution (i.e. 0.2823 mol of sodium hydroxide) are then added. The mixture is rinsed with 10 ml of IPA. The cationic guar swells, and has a tendency to sediment out and to stick to the walls. Increasing the stirring speed to 277 rpm allows the powder to be redispersed, and the medium is left under these conditions for 1 hour 30 minutes, under an argon atmosphere. x mol of monochloroacetic acid (MCAA) dissolved in 50 ml of IPA are then added.

The amounts x of MCAA are as follows:

| Example | x | NaOH/MCAA ratio |
|---|---|---|
| 1 | 0.136 mol | 2/1 |
| 2 | 0.54 mol | 4/1 |
| 3 | 1.08 mol | 8/1 |

The mixture is rinsed with 10 ml of IPA. The reaction mass is then heated to 60° C. using a bath thermostatically maintained at 66° C., and is left under these conditions for 3 hours 30 minutes at 60° C. After this time, the heating is stopped and the reaction mass is cooled to 25° C.

The reaction medium is filtered through a No. 3 sinter final. A beige/orange wet solid is thus isolated, the filtrate being clear pale yellow and basic. The solid is then dissolved in 700 ml of demineralized water, to give a very viscous solution. The product is then precipitated from methanol and then filtered off and washed with MeOH/$H_2O$ mixtures (80/20) until the filtrate obtained has a pH of about 7. A final wash is performed with pure methanol and the solid is isolated and oven-dried at 45° C. under 100 mmHg.

The characteristics of the ampholytic guars obtained are as follows:

| Ex. | DS cationic function | DS anionic function | Theoretical anionic charge/cationic charge (theoretical) molar ratio | Weight-average molar mass g/mol |
|---|---|---|---|---|
| 1 | 0.14 | 0.35 | 2.5/1 | 2 150 000 |
| 2 | 0.14 | 1.40 | 10/1 | 1 350 000 |
| 3 | 0.14 | 2.8 | 20/1 | 1 150 000 |

EXAMPLE 4

Detergent Formulation

| Constituents | Formulation (A) with P % by weight | (B) color without P % by weight | (C) without P % by weight |
|---|---|---|---|
| NaTPP | 40 | | |
| Zeolite 4A | 0 | 25 | 25 |
| 2 $SiO_2$, $Na_2O$ silicate | 5 | 5 | 5 |
| Sodium carbonate | 5 | 15 | 15 |
| Acrylate/maleate copolymer Sokalan CP5 (BASF) | 0 | 5 | 5 |
| Sodium sulfate | 7 | 20 | 7 |
| CMC blanose 7MXF (HERCULES) | 1 | 1 | 1 |
| Perborate monohydrate | 15 | 0 | 15 |
| Granulated TAED | 5 | 0 | 5 |
| Anionic surfactant Laurylbenzene sulfate (Nansa) | 6 | 8 | 6 |
| Nonionic surfactant Symperonic A3 (3 EO ethoxylated alcohol - ICI) | 3 | 5 | 3 |
| Nonionic surfactant Symperonic A9 (9 EO ethoxylated alcohol - ICI) | 9 | 11 | 9 |
| Enzymes (esterases, amylases, cellulase, protease) | 0.5 | 0.5 | 0.5 |
| Fragrances | 1 | 1 | 1 |
| Amphoteric polysaccharide (% solids) of example 1, 2 or 3 | 2.0 | 2.0 | 2.0 |
| Polyvinylpyrrolidone | 0 | 1 | 0 |
| Soil-release sulfonated Copolyester REPEL-O-TEX PF 594 from Rhodia | 0.5 | 0.5 | 0.5 |

A washing operation is performed in a Tergotometer laboratory machine which is well known in the profession to detergent composition formulators. The machine simulates the mechanical and thermal effects of pulsating-type American washing machines, but, by virtue of the presence of 6 washing drums, it makes it possible to carry out simultaneous series of tests with an appreciable saving in time.

20×20 cm test pieces are cut from unfinished cotton.

The cotton test pieces are first ironed so that they all have the same level of creasing before washing.

They are then washed using the above detergent formulation containing the amphiphilic polysaccharide and rinsed once, under the following conditions:

number of test pieces per Tergotometer drum: 2 volume of water: 1 liter water of French hardness 30° TH obtained by suitable dilution of Contrexeville® brand mineral water washing product concentration: 5 g/l washing temperature: 40° C.

washing time: 20 min spin speed of the Tergotometer: 100 rpm rinsing with cold water (about 30° TH)

rinsing time: 5 minutes

The test pieces are then creased under a 3 kg press for 20 seconds, after which they are dried vertically overnight.

The same operation is performed using the same detergent formulation, but free of the amphiphilic polysaccharide.

A digital color photograph is then taken of the dry test pieces, which is then converted into 256 levels of gray (gray scale from 0 to 255).

The number of pixels corresponding to each level of gray are counted.

For each histogram obtained, the standard deviation σ of the distribution of the level of gray is measured.

σ1 corresponds to the standard deviation obtained with the detergent formulation containing no amphiphilic polysaccharide.

σ2 corresponds to the standard deviation obtained with the detergent formulation containing the amphiphilic polysaccharide.

The performance value is given by the equation $-\Delta\sigma = \sigma 2 - \sigma 1$ The performance values obtained are as follows:

| Formulation With the amphoteric polysaccharide of example 1 | (A) | (B) | (C) |
|---|---|---|---|
| $-\Delta\sigma$ | +2.6 | +2.8 | +2.7 |
| Formulation (B) with the amphoteric polysaccharide of example | 2 | 1 | 3 |
| $-\Delta\sigma$ | +1 | +2.8 | +2.1 |

These positive values of $-\Delta\sigma$ are representative of a crease-resistance property provided by the detergent formulation comprising the amphiphilic polysaccharide according to the invention.

EXAMPLE 5

Rinsing/Softening Formulation

| Constituents | % by weight |
|---|---|
| Cationic surfactant: ditallow dimethylammonium chloride | 5% |
| Fragrance | 1% |
| HCl to obtain a pH = 3 | 0.2% |
| Amphoteric polysaccharide of examples 1 to 3 (% solids) | 2% |

EXAMPLE 6

Measurement of the Protection of Colors

Principle

This consists in performing, under defined conditions, 10 washes of a sample of several colored cotton fabrics. The color protection efficacy is tested in an automatic washing machine. The actual assessment is performed by a reflectance measurement. The fabrics are examined before and after 10 washes. The variation in color thus recorded ($\Delta E^*$) constitutes the loss of color on each type of fabric.

Apparatus-Reagents

AEG Lavamat 2050 Turbo automatic washing machine: Commercial front-loading washing machine—wash cycles at 40° C.—volume of washing water: 13 liters Recorded program: 10 wash cycles LUCI100—Dr Lange reflectometer:

This is a reflectance machine used for measuring the colors of fabrics before and after washing.

6 tea towels: made of gray cotton cloth referenced 402MBLI (from D. PORTHAULT SA)

4 towels (as ballast): plush-loop white cotton terry towel 500 g/m² (from D. PORTHAULT SA)

Sampling of 3 different commercial colored fabrics
   black woven cotton
   red woven cotton
   violet woven cotton Procedure

| Washing conditions: | |
|---|---|
| Wash temperature: | 40° C. |
| Duration: | about 67 min |
| Number of washes: | 10 |
| Laundry load: | 3 kg dry weight (4 towels + 6 tea cloths + colored fabrics) |
| Bath volume: | 13 liters ± 1 liter |
| Water hardness: | about 23° TH French |
| Washing formula concentration: | 5 ± 0.1 g/l |

Procedure: 5 Steps

Measuring the color of the new fabric samples

Sewing of the colored fabric samples to the tea cloths in order to avoid fraying during the successive washes Performing the 10 washes without drying between the cycles Drying in open air Measuring the colors on the washed fabrics The colors are measured on a LUCI100 reflectometer:

The measuring system used is the CIE [International Commission on Illumination]—L*a*b* system (DIN6174, CIE-LAB 1976).

It is made up as follows:

L* corresponds to the degree of whiteness on a white-black scale.

L*=100 for a white sample

L*=0 for a black sample a* positions the color in a range from green to red.

$a^* \geq 0$ the color tends toward red.

$a^* \leq 0$ the color tends toward green.

b* positions the color in a range from yellow to blue.

$b^* \geq 0$ the color tends toward yellow.

$b^* \leq 0$ the color tends toward blue.

Each sample of fabric is measured at 5 different points (one at the center and one in each corner) and the average of the components L*, a* and b* is calculated.

Exploiting the Results:

The reflectometer is equipped with software that indirectly calculates the $\Delta E^*$ from the data recorded above. This value corresponds to the color variation recorded on the fabric after washing and is expressed as follows:

$$\Delta L^* = L^*_{after\ washing} - L^*_{before\ washing}$$

$$\Delta a^* = a^*_{after\ washing} - a^*_{before\ washing}$$

$$\Delta b^* = b^*_{after\ washing} - b^*_{before\ washing}$$

The loss of color for each fabric is then given by the following expression:

$$\Delta E^* = \sqrt{(\Delta L^*)^2 + (\Delta a^*)^2 + (\Delta b^*)^2}$$

The performance quality of the polysaccharide relative to the reference is measured as the difference in $\Delta E^*$ between the formulations without and with polysaccharide.

The cumulative loss of color is calculated as the sum of the losses of color of the colored fabrics.

The detergent formulations (F1) and (F2) below are prepared.

| Constituents | Formulation | |
| --- | --- | --- |
| | (F1) without P % by weight | (F2) without P % by weight |
| NaTPP | | |
| Zeolite 4A | 25 | 25 |
| 2 SiO$_2$, Na$_2$O silicate | 5 | 5 |
| Sodium carbonate | 15 | 15 |
| Acrylate/maleate copolymer Sokalan CP5 (BASF) | 5 | 5 |
| Sodium sulfate | 9 | 8.5 |
| CMC blanose 7MXF (HERCULES) | 1 | 1 |
| Perborate monohydrate | 15 | 15 |
| Granulated TAED | 5 | 5 |
| Anionic surfactant Laurylbenzene sulfate (Nansa) | 6 | 6 |
| Nonionic surfactant Symperonic A3 (3 EO ethoxylated alcohol - ICI) | 3 | 3 |
| Nonionic surfactant Symperonic A9 (9 EO ethoxylated alcohol - ICI) | 9 | 9 |
| Enzymes (esterases, amylases, cellulase, protease) | 0.5 | 0.5 |
| Fragrances | 1 | 1 |
| Amphoteric polysaccharide (% solids) of example 2 | 0 | 0.5 |
| Polyvinylpyrrolidone | 0 | 0 |
| Soil-release sulfonated Copolyester REPEL-O-TEX PF 594 from Rhodia | 0.5 | 0.5 |

Formulation (F1) without amphoteric polysaccharide and formulation (F2) comprising 0.5% amphoteric polysaccharide are tested as described above.

The percentage color protection index (IP) is given by the following expression $IP = \{[\Delta E \text{ of (F1)}] - [\Delta E \text{ of (F2)}]/[\Delta E \text{ of (F1)}]\} \times 100$ The results obtained are as follows:

| Fabric | (F1) | (F2) | IP |
| --- | --- | --- | --- |
| Black | 5.0 | 3.8 | 24% |
| Red | 6.5 | 2.7 | 58% |
| Violet | 6.5 | 6.1 | 7% |
| cumulative loss of color $\Delta E$ | 18 | 12.6 | 27% |

These results show that the presence of amphoteric polysaccharide in the formulation (F) allows the protection of the colors to be improved.

The invention claimed is:

1. A process for improving the properties of compositions for treating or caring for articles made of textile fibers in aqueous or wet medium, said properties being preventing degradation of the articles, protecting colors of the articles, imparting crease-resistance, or softening, said process comprising the steps of adding to said compositions an effective amount of at least one amphoteric polysaccharide, as an agent for preventing the degradation of said articles, for protecting the colors of said articles, for affording said articles crease-resistance or softening, said amphoteric polysaccharide being a carboxymethyl hydroxypropyltrimethylammonium chloride galactomannan, or a carboxymethyl hydroxypropyl hydroxypropyltrimethylammonium chloride galactomannan said amphoteric polysaccharide having a native skeleton which is a polysaccharide formed from:

a main chain comprising similar or different anhydrohexose units, and branches comprising at least one neutral or anionic anhydropentose or anhydrohexose unit, the anhydrohexose or anhydropentose units of said amphoteric polysaccharide being substituted or modified with one or more groups bearing at least one anionic charge and one or more groups bearing at least one cationic charge, wherein the anionic and the cationic charges are provided by groups of formula:

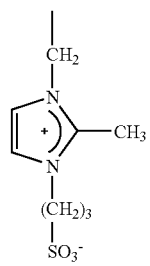

2-methyl(3-sulfopropyl)imidazolium group,

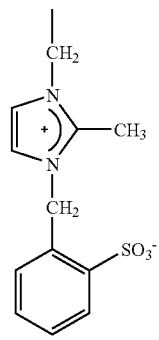

(2-sulfobenzyl)imidazolium group,

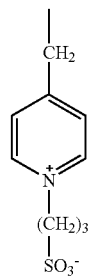

(3-sulfopropyl)pyridinium group, —(CH$_2$)$_2$—N$^+$(CH$_3$)$_2$—(CH2)$_2$—COO$^-$ ethyl-dimethylammonium betaine group, or —(CH$_2$)$_2$—N$^{30}$ (CH$_3$)$_2$—(CH$_2$)$_3$—SO$_3^{31}$ sulfo-propyl dimethylammonium group and said amphoteric polysaccharide having a degree of substitution or of modification DSi with all said groups bearing ionic charges ranging from 0.01 to less than 3, and
with a ratio of the number of anionic charges to the number of cationic charges ranging from 99.5/0.5 to 30/70.

2. The process according to claim 1, wherein the degree of substitution or of modification DSi is from 0.05 to 2.5 and the ratio is from 99.5/0.5 to 50/50.

3. The process according to claim 1, wherein said amphoteric polysaccharide further contains at least one nonionic group.

4. The process according to claim 3, wherein said nonionic group of said amphoteric polysaccharide is linked to a carbon atom of the sugar skeleton either directly or via —O— bonds.

5. The process according to claim 3, wherein the nonionic groups of said amphoteric polysaccharide having the formula:

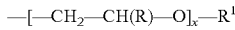

wherein:
R is a hydrogen atom or an alkyl radical containing from 1 to 4 carbon atoms,
x is an integer ranging from 0 to 5,
$R^1$ represents:
a hydrogen atom
an alkyl radical containing from 1 to 22 carbon atoms, optionally interrupted
with one or more oxygen and/or nitrogen hetero atoms, cycloalkyl, aryl or
arylalkyl, containing from 6 to 12 carbon atoms,
a radical—$(CH_2)_y$—$COOR^2$
a radical—$(CH_2)_y$—$CN$
a radical—$(CH_2)_y$—$CONHR^2$
wherein $R^2$ represents an alkyl, aryl or arylalkyl radical containing from 1 to 22 carbon atoms, and
y is an integer ranging from 0 to 5, or
—CO—NH—$R^1$
wherein $R^1$ has the definition given above, and
wherein said formula—$[—CH_2—CH(R)—O—]_x—R^1$ is linked to a carbon atom of the sugar skeleton via an—O— bond —;

6. The process according to claim 5, wherein the nonionic groups of said amphoteric polysaccharide are methyl, ethyl, propyl, isopropyl, butyl, hexyl, octyl, dodecyl, octadecyl, phenyl, benzyl, linked to a carbon atom of the sugar skeleton via an ether, ester, amide or urethane bond.

7. The process according to claim 5, wherein the nonionic groups of said amphoteric polysaccharide are cyanoethyl, hydroxyethyl, hydroxypropyl, or hydroxybutyl, linked to a carbon atom of the sugar skeleton via an—O— bond.

8. The process according to claim 1, wherein said composition for treating articles made of textile fibers in aqueous or wet medium is
in the form of a solid or of a dispersion or of a concentrated aqueous solution placed in contact with the articles to be treated, after dilution in water;
in the form of a dispersion or of a concentrated aqueous solution placed beforehand on the dry articles to be treated before dilution in water;
in the form of a dispersion or of an aqueous solution to be placed directly on the dry articles to be treated without dilution or of a solid support comprising said amphoteric polysaccharide, to be applied directly to the dry articles to be treated; or
in the form of an insoluble solid support comprising said amphoteric polysaccharide placed directly in contact with the wet articles to be treated.

9. The process according to claim 1, wherein the amount of said amphoteric polysaccharide ranges from 0.0 5% to 10% by weight relative to the weight of said composition expressed as solids.

10. The process according to claim 1, wherein said composition is a solid or liquid detergent formulation comprising from 0.05% to 5% by weight of said amphoteric polysaccharide, composition capable of directly forming a washing bath by dilution.

11. The process according to claim 1, wherein said composition is an aqueous liquid rinsing or softening formulation comprising from 0.05% to 3% by weight of said amphoteric polysaceharide, composition capable of directly forming a rinsing andlor softening bath by dilution.

12. The process according to claim 1, wherein said composition is a tumble dryer additive in the form of a solid material, comprising from 0.0 5% to 10% by weight of said amphoteric polysaccharide, composition intended to be placed in contact with the wet textile articles in a tumble dryer.

13. The process according to claim 12, wherein solid material is a textile material placed in contact with the wet textile articles in the flimble dryer.

14. The process according to claim 1, wherein said composition is an aqueous liquid ironing formulation comprising from 0.05% to 10% by weight of said amphoteric polysaccharide.

15. The process according to claim 1, wherein said composition is a prespotter comprising from 0.05% to 10% by weight of said amphoteric polysaccharide, intended to be applied to the dry articles prior to a washing operation using a detergent formulation containing or not containing said amphoteric polysaccharide.

* * * * *